(12) United States Patent
Boere et al.

(10) Patent No.: US 11,843,294 B2
(45) Date of Patent: Dec. 12, 2023

(54) MOTOR FOR A PERSONAL CARE DEVICE

(71) Applicant: KONINKLIJKE PHILIPS N.V., Eindhoven (NL)

(72) Inventors: Stijn Willem Boere, Eindhoven (NL); Jan Willem Bruggers, Horst (NL); Nathan Farrell, Kirkland, WA (US); Wolter F. Benning, Seattle, WA (US); Paul Leonard, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 567 days.

(21) Appl. No.: 17/046,817

(22) PCT Filed: Apr. 12, 2019

(86) PCT No.: PCT/EP2019/059489
§ 371 (c)(1),
(2) Date: Oct. 12, 2020

(87) PCT Pub. No.: WO2019/197643
PCT Pub. Date: Oct. 17, 2019

(65) Prior Publication Data
US 2021/0152066 A1    May 20, 2021

Related U.S. Application Data

(60) Provisional application No. 62/657,248, filed on Apr. 13, 2018.

(51) Int. Cl.
*H02K 21/02* (2006.01)
*H02K 7/08* (2006.01)
(Continued)

(52) U.S. Cl.
CPC ............. *H02K 21/026* (2013.01); *A46B 9/04* (2013.01); *A46B 13/02* (2013.01); *A61C 17/22* (2013.01);
(Continued)

(58) Field of Classification Search
CPC ........ H02K 21/026; H02K 7/08; H02K 7/145; H02K 2201/03
(Continued)

(56) References Cited

U.S. PATENT DOCUMENTS 2,196,667 A      4/1940  Moseley
2,917,758 A  *  12/1959  Held .................. A61C 17/3472
                                                    310/36
(Continued)

FOREIGN PATENT DOCUMENTS

JP      2003180050 A    6/2003
RU      2493760 C2      9/2013
(Continued)

OTHER PUBLICATIONS

International Search Report and Written Opinion, International Application No. PCT/EP2019/059489, dated Jun. 27, 2019.

*Primary Examiner* — Jose A Gonzalez Quinones

(57) ABSTRACT

According to an aspect there is provided a motor (1) for a personal care device (10). The motor (1) comprises: a stator (2) comprising a stator surface; a rotor (3) comprising a rotor surface disposed opposite the stator surface; and a spacer (4) projecting between the stator surface and the rotor surface so as to define a minimum airgap between the stator (2) and the rotor (3). The spacer (4) is disposed on or at one of the rotor surface and the stator surface, and has a contact surface configured to engage with the other one of the rotor surface and the stator surface.

13 Claims, 17 Drawing Sheets

(51) Int. Cl.
    *H02K 7/14*     (2006.01)
    *A46B 9/04*     (2006.01)
    *A46B 13/02*    (2006.01)
    *A61C 17/22*    (2006.01)

(52) U.S. Cl.
    CPC ............. *H02K 7/08* (2013.01); *H02K 7/145* (2013.01); *H02K 2201/03* (2013.01)

(58) Field of Classification Search
    USPC .............................................. 310/50, 51, 81
    See application file for complete search history.

(56) References Cited

U.S. PATENT DOCUMENTS

| | | |
|---|---|---|
| 6,054,786 A | 4/2000 | Springer |
| 9,608,502 B2 | 3/2017 | Shin |
| 2002/0008429 A1 | 1/2002 | Masuzawa et al. |
| 2014/0015346 A1* | 1/2014 | Schober ................. H02K 33/16 310/15 |
| 2015/0236576 A1 | 8/2015 | Shin |
| 2017/0040867 A1* | 2/2017 | Takagi ..................... H02K 3/47 |

FOREIGN PATENT DOCUMENTS

| | | |
|---|---|---|
| WO | 2007148783 A1 | 12/2007 |
| WO | 2014009916 A2 | 1/2014 |
| WO | 2015159162 A1 | 10/2015 |
| WO | 2015159215 A1 | 10/2015 |

\* cited by examiner (1)

(2)

(3)

MOTOR FOR A PERSONAL CARE DEVICE

This application is the U.S. National Phase application under 35 U.S.C. § 371 of International Application No. PCT/EP2019/059489, filed on 12 Apr. 2019, which claims the benefit of U.S. Provisional Application No. 62/657,248, filed 13 Apr. 2018. These applications are hereby incorporated by reference herein.

TECHNICAL FIELD

Embodiments of the present invention relate generally to motors for personal care devices, such as, for example, power toothbrushes, power shavers and skin care devices.

BACKGROUND

A drivetrain in a personal care device is an electromagnetic module which creates the necessary movements of the device. In a power toothbrush, the drivetrain creates the oscillatory movements of the brush head. The drivetrain comprises a motor, which includes a rotor and a stator. The rotor and stator are separated by an airgap, which is important for correct operation of the motor. If the airgap is closed, the friction force between the rotor and the stator may prevent relative motion.

It is therefore desirable to maintain and prevent closure of the airgap to ensure proper functioning of the motor.

SUMMARY

According to an embodiment of a first aspect, there is provided a motor for a personal care device, the motor comprising: a stator comprising a stator surface; a rotor comprising a rotor surface disposed opposite the stator surface; and a spacer projecting between the stator surface and the rotor surface so as to define a minimum airgap between the stator and the rotor, wherein the spacer is disposed on or at one of the rotor surface and the stator surface, and has a contact surface configured to engage with the other one of the rotor surface and the stator surface.

That is, a spacer is permanently provided between the rotor and the stator to define the minimum airgap. The presence of the spacer between the rotor and the stator prevents airgap closure since the rotor and stator are not able to completely come together. In other words, the spacer prevents the rotor surface and the stator surface from coming into direct contact with each other (at any point other than at the spacer contact surface), and maintains a distance between the stator and the rotor. It may also be seen that the size of the spacer determines the (minimum) size of the airgap and so the length of the projection may correspond to the desired airgap size. Accordingly, a longer spacer (i.e. one that projects further from the rotor surface or the stator surface) will result in a larger distance between the stator and the rotor, and therefore a larger airgap, while a spacer with a shorter projection will define a smaller airgap.

The rotor and the stator are arranged adjacent to each other, with each having a surface at the interface which opposes the other surface, i.e. they are arranged such that the stator surface faces the rotor surface. The spacer is disposed on or at either the stator surface or the rotor surface and so the minimum airgap may, more specifically, be defined between these surfaces. If the spacer is disposed on or at the stator surface, then a contact surface of the spacer is configured to contact the rotor surface such that the rotor may be abutted against the spacer, with contact occurring between the rotor surface and the contact surface. Conversely, if the spacer is provided on the rotor surface, then the contact surface of the spacer is configured to contact the stator surface of the stator, and the stator may abut against the contact surface of the spacer.

However, it is also possible for there to be no contact between the contact surface of the spacer and the stator surface or the rotor surface, such that the spacer is disposed on or at one of the rotor surface and the stator surface, and is separated from the other one of the rotor surface and the stator surface. The separation may be in the range of, for example, 0.1 mm to 5 mm. The contact surface may therefore be configured to, adapted to or capable of engaging with (i.e. contacting) the rotor surface or the stator surface, yet may not actually engage with or contact the rotor surface or the stator surface.

According to embodiments of the present invention, the minimum airgap is therefore explicitly set by the components of the motor (i.e. the spacer), such that calibration/setting of the airgap is integrated in the device. The airgap may automatically be set to a correct minimum size and maintained during the lifetime of the drivetrain by the spacer. The spacer corresponds to a minimum airgap between the rotor and the stator, yet the spacer does not determine the maximum airgap. That is, the airgap may be larger than the length of the projection of the spacer since a separation or gap may be provided between the distal end of the spacer and the surface of the rotor or the stator which the spacer is configured to engage with or contact. It can therefore be seen that the airgap may be set to a desired distance but that the spacer is provided as a 'back-up' to ensure that a minimum distance is always provided between the rotor and the stator. The motor may be provided as part of a drivetrain.

The presence of the spacer, and its arrangement between the stator and the rotor, defines and maintains the minimum airgap. It may be considered that the spacer is disposed on or at the stator surface or the rotor surface at its proximal end, and that the contact surface of the spacer is at its distal end, which contacts the other one of the stator surface or the rotor surface. The spacer may also be referred to as a spacer element, projection, protrusion, jut, bearing or bearing point. Since the spacer projects from the stator surface or the rotor surface, it is evident that the surface area of the contact surface of the spacer is smaller than each of the surface area of the stator surface and surface area of the rotor surface. More than one spacer may be provided, each of the one or more spacers being disposed on or at one of the rotor surface and the stator surface, and each comprising a contact surface configured to engage with (i.e. contact) the other one of the rotor surface and the stator surface.

The rotor and stator are arranged in the motor such that the rotor is configured to at least partially rotate with respect to the stator, the rotor rotating about a rotation axis. According to a preferred embodiment, the spacer is aligned with the rotation axis of the rotor. That is, the spacer may preferably be disposed at the rotation center of the rotor. Mutual friction between the spacer and the rotor surface or stator surface may therefore be reduced since the spacer contacts the center point of the rotor surface or stator surface.

It is preferable that the spacer is at least partially formed from one or more of: a wear resistant material; a material with a low coefficient of friction; and an impact resistant material. An example of such a material is polyoxymethylene. At least the contact surface of the spacer is preferably formed from such a material. The material may improve the durability and lifespan of the spacer, as well as reducing the friction between the spacer, specifically the contact surface of the spacer, and the rotor surface or the stator surface. Similarly, a portion of the stator surface or rotor surface configured to engage with the spacer may be provided by or formed from a material which is wear resistant, has a low coefficient of friction, and/or is impact resistant.

The form of the spacer may vary. The spacer may be a ball bearing which may at least partially rotate with respect to the rotor and the stator. The ball bearing may be retained in a socket on the rotor surface or the stator surface such that it may rotate freely within the socket. The surface of the ball bearing protruding from the socket then forms the contact surface. Since the ball bearing freely moves with respect to both the stator and the rotor, friction may be reduced between the ball bearing and the surfaces of the rotor and stator.

According to a preferred embodiment, the spacer is formed on or connected to the stator such that the spacer projects from at least part of the stator surface. That is, it is preferable that the spacer is disposed on or at the stator surface, such that it extends from the stator surface and is configured to engage with (i.e. contact) the rotor surface at the contact surface. The spacer may be attached to or incorporated into the stator in any suitable way, examples of which are provided in the detailed description.

The stator surface may be configured to receive a plate comprising the spacer. That is, a plate in which the spacer is incorporated may be attached to the stator surface by means of interconnection or fixation between the plate and the stator surface. For example, the stator surface may comprise a recess configured to receive a spacer plate, and the recess may be provided with crush ribs or snaps at its periphery to retain the spacer plate in the recess. Such an arrangement may allow for simpler manufacturing and assembly, and/or secure attachment of the spacer to the stator surface. In an alternative arrangement, the rotor surface may be similarly configured to receive a plate comprising the spacer.

The stator may preferably comprise a core formed of a plurality of laminations, and the spacer may be a projection extending from at least one of the ends of the laminations of the core. That is, the laminations, such as iron laminations, may be arranged in the stator such that the ends of the laminations provide at least part of the stator surface, from which a projection of one or more ends of the laminations may extend to provide the spacer.

The stator may comprise more than one core formed of a plurality of laminations and each core may comprise a projection to provide more than one spacer. That is, a projection may extend from one or more ends of the laminations in each core (i.e. a projection may extend from each of the core ends) thereby providing multiple spacer elements, with the distal end of each projection configured to engage with the rotor surface. According to this embodiment, it may be seen that the ends of each of the cores each form at least part of the stator surface. In a preferred embodiment, the stator comprises two cores.

If one or more ends of the one or more cores provides at least part of the stator surface, then it may be seen that the one or more of the ends of the one or more cores may be configured to receive a plate comprising the spacer. That is, the end(s) of the core(s) may be shaped to receive a spacer plate. For example, the end(s) of the core(s) may be provided with a step for receiving a spacer plate.

The stator may also comprise a bobbin, in which the one or more cores are arranged and held. The end of the bobbin may provide at least part of the stator surface, such that the spacer may be disposed or formed on the end of the bobbin. The bobbin may comprise multiple parts, such as two complementary bobbin halves.

At least part of the rotor surface may have a low friction coating. Additionally or alternatively, at least part of the stator surface may have a low friction coating. Thus the mutual friction between the spacer and the stator surface or rotor surface may be reduced. Similarly, a plate made of a low friction and/or wear resistant material may be provided on at least part of the rotor surface. A plate made of a low friction and/or wear resistant material may be provided on at least part of the stator surface.

According to a preferred embodiment, the contact surface of the spacer is curved. That is, the distal end of the spacer is rounded, curved, or has a hemispherical type shape to provide a curved contact surface. The contact area between the spacer and the stator surface or the rotor surface at the contact surface of the spacer may thereby be reduced, so as to minimize friction.

The rotor surface is any surface of the rotor, or any surface of any part or component of the rotor, that is disposed opposite the stator. Similarly, the stator surface is any surface of the stator, or any surface of any part or component of the stator, that is disposed opposite the rotor. For example, either or each of the rotor and the stator may comprise a plate or cover disposed at the interface between the rotor and the stator, such that a surface of the plate or cover provides the rotor surface and/or stator surface. Furthermore, the rotor surface may be made up of more than one surface of the rotor or components of the rotor. Likewise, the stator surface may comprise multiple surfaces of the stator or stator components. The stator surface(s) is disposed opposite or facing the rotor surface(s).

The rotor may preferably comprise a magnet with a magnet surface, which provides all or part of the rotor surface. That is, the rotor may be configured such that the magnet is disposed opposite/facing the stator, such that the rotor surface is a surface of the magnet. Similarly, the stator may comprise one or more iron cores, and the ends of one or more of the iron cores may provide all or part of the stator surface.

According to an embodiment of a second aspect, there is provided a stator for use in a motor in a personal device, the motor comprising the stator and a rotor, the stator comprising: a stator surface; and a spacer projecting from the stator surface for engaging with a rotor surface of the rotor and defining a minimum airgap between the stator and the rotor.

Embodiments of the present invention therefore extend to a stator for a motor in a personal device and a motor comprising the stator. Features of the first aspect apply to the second aspect mutatis mutandis, and vice versa.

According to an embodiment of a third aspect, there is provided a personal care device comprising a motor or a stator according to the above aspects of the present invention. For example, the personal care device may be an oral care device, such as a power toothbrush, a power shaver, or a skin care device, such as a skin massager. Embodiments of the present invention may be applied to any inline magnet-stator configuration. The motor may be provided as part of a drivetrain of such a device.

The present invention extends to method aspects corresponding to the apparatus aspects.

In particular, according to an embodiment of a fourth aspect, there is provided a method of manufacturing a motor for a personal care device, the method comprising: mounting a rotor comprising a rotor surface in the motor; placing a stator comprising a stator surface in the motor adjacent to the rotor such that the rotor surface is opposite the stator surface and a spacer, disposed on or at one of the rotor surface and the stator surface, is projecting between the stator surface and the rotor surface so as to define a minimum airgap between the stator and the rotor; moving the stator towards the rotor such that a contact surface of the spacer engages with the other one of the rotor surface and the stator surface; and fixing the stator in the motor.

Accordingly, the spacer determines and controls the minimum airgap between the rotor and the stator and the stator is fixed in the motor at a position where a desired airgap is provided between the rotor and the stator. The means for setting the airgap is explicitly and permanently present in the product itself. No additional component, such as a shim, is required and a shimming procedure is not required. Assembly complexity and costs may therefore be reduced.

The stator may be moved towards the rotor by means of a magnetic force provided between the rotor and the stator. The stator may be fixed into position using any suitable fixing means, such as, for example, screws or bolts.

It may therefore be seen that embodiments of the present invention may provide means for setting the minimum airgap between the rotor and the stator, and for controlling the airgap during the lifetime of the motor. As discussed above, the manufacturing method according to embodiments of the present invention may remove the requirement for a shimming procedure during production, thereby reducing manufacturing complexity and costs.

BRIEF DESCRIPTION OF THE DRAWINGS

Embodiments of the present disclosure may take form in various components and arrangements of components, and in various steps and arrangements of steps. Accordingly, the drawings are for purposes of illustrating the various embodiments and are not to be construed as limiting the embodiments. In the drawing figures, like reference numerals refer to like elements. In addition, it is to be noted that the figures may not be drawn to scale.

DETAILED DESCRIPTION

Figure 1:
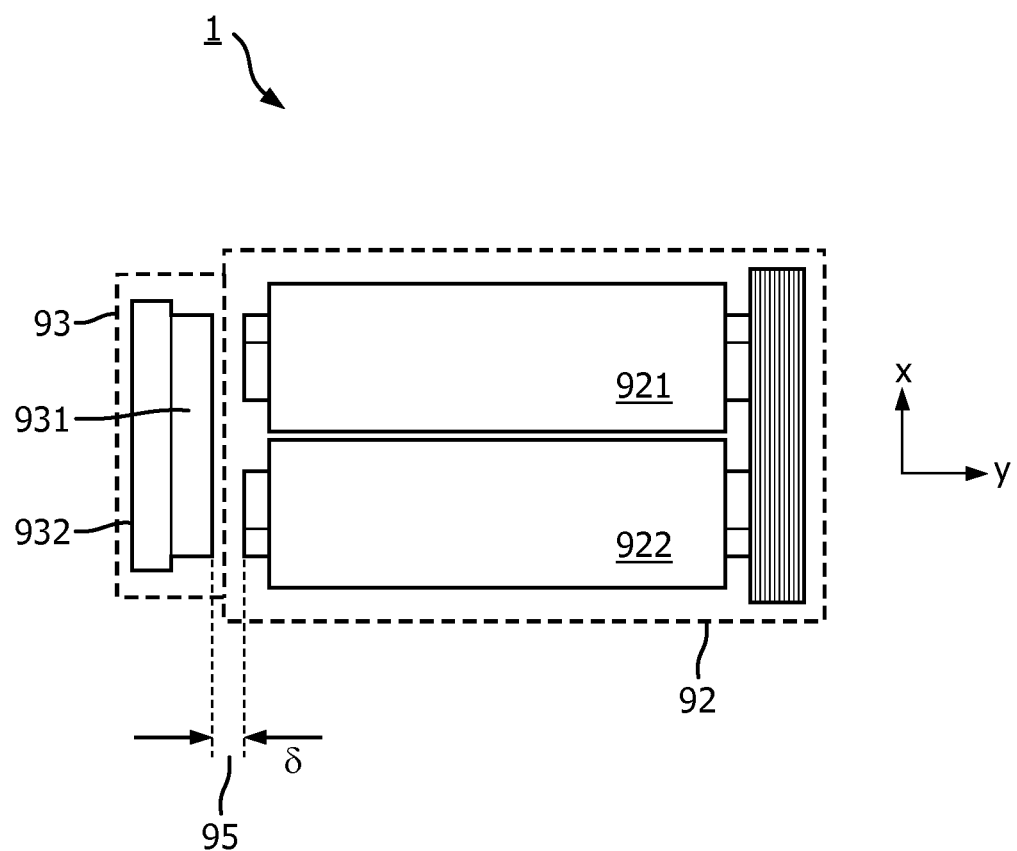
FIG. 1 is a diagram of the exemplary motor discussed above.

The embodiments of the present disclosure and the various features and advantageous details thereof are explained more fully with reference to the non-limiting examples that are described and/or illustrated in the drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the embodiments of the present may be practiced and to further enable those of skill in the art to practice the same. Accordingly, the examples herein should not be construed as limiting the scope of the embodiments of the present disclosure, which is defined solely by the appended claims and applicable law.

It is understood that the embodiments of the present disclosure are not limited to the particular methodology, protocols, devices, apparatus, materials, applications, etc., described herein, as these may vary. It is also to be understood that the terminology used herein is used for the purpose of describing particular embodiments only, and is not intended to be limiting in scope of the embodiments as claimed. It must be noted that as used herein and in the appended claims, the singular forms "a," "an," and "the" include plural reference unless the context clearly dictates otherwise.

Unless defined otherwise, all technical and scientific terms used herein have the same meanings as commonly understood by one of ordinary skill in the art to which the embodiments of the present disclosure belong. Preferred methods, devices, and materials are described, although any methods and materials similar or equivalent to those described herein may be used in the practice or testing of the embodiments.

FIG. 1 shows an example of a common configuration of a motor 1 used in a drivetrain. The motor comprises a stator 92 and a rotor 93, which are separated by an airgap 95. In this configuration, two iron core coils 921, 922 form the stator 92 and the rotor 93 is formed by a magnet 931 and a back iron 932. The interaction between the magnetic field from the stator 92 and the rotor 93 causes a torque in the y-direction. This torque results in movement of the rotor 93 around the y-axis.

The airgap 95 separates the stator and the rotor and the airgap is necessary for proper functioning of the motor. If the airgap is closed, such that $\delta=0$, the friction force between the rotor and the stator may prevent relative motion. It is therefore important that the airgap is present in the motor.

Furthermore, the airgap may be used to alter the performance and efficiency of the motor. A larger airgap reduces the interaction between the magnetic field of the stator and the rotor, and therefore reduces the effective torque generated on the rotor. A smaller airgap increases the interaction between the magnetic field of the stator and the rotor and therefore increases the effective torque generated on the rotor. Setting and maintaining the airgap at a particular distance is therefore important for achieving the desired operation of the motor.

A common method currently used for setting the airgap requires the use of a shim in a process called 'shimming', in which the shim explicitly controls the airgap during production. In this process, a shim (a strip with the correct thickness) is placed in between the rotor 93 and the stator 92 before the stator is fixed to the motor or drivetrain frame. The stator slides towards the strip under magnet attraction forces. Subsequently, the stator is fixed in position and the shim is removed, thereby setting the airgap to the correct size.

Figure 2:
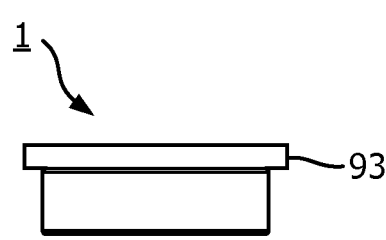
FIG. 2 is a diagram of the manufacturing process of shimming discussed above.
Figure 2:
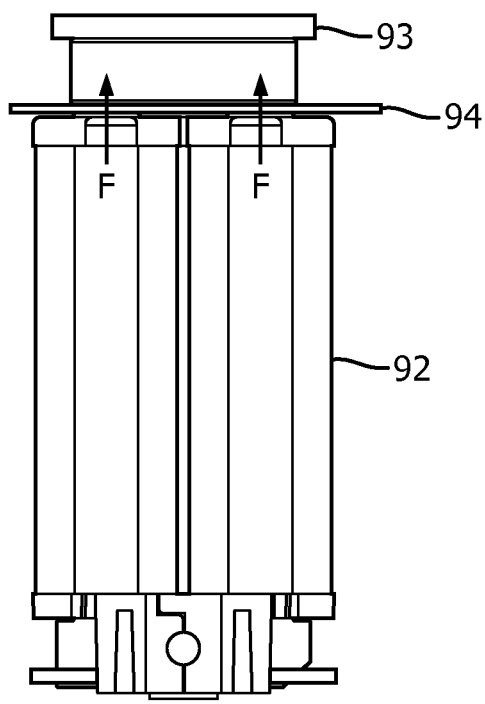
Figure 2:
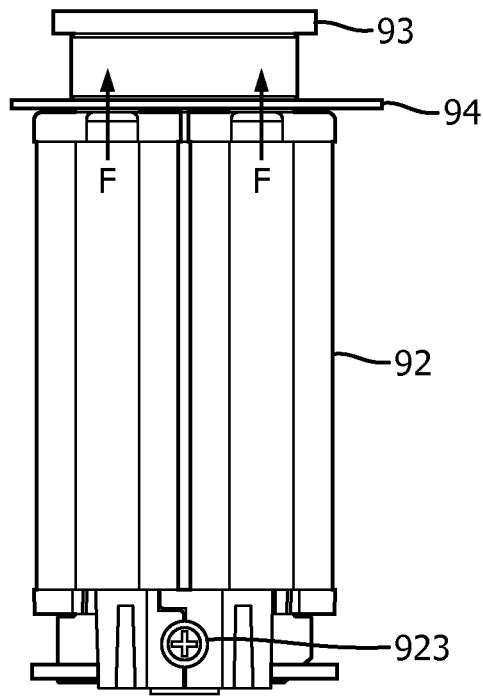
Figure 2:
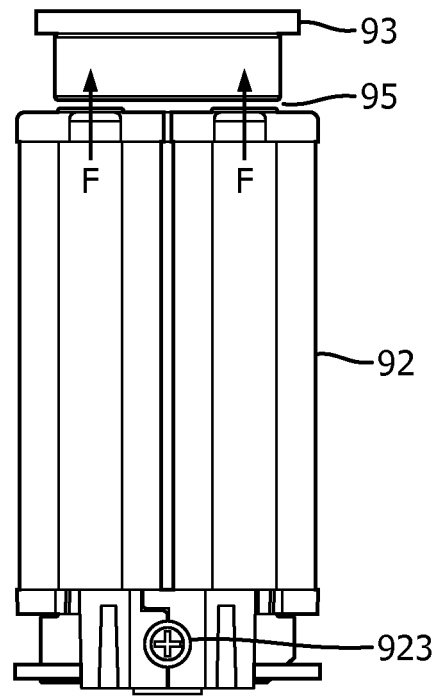

FIG. 2 shows an example of such a process. A rotor 93 is mounted in the motor 1 in step (1) and then a stator 92 is positioned in the motor, with a separate shim 94 placed between the rotor 93 and the stator 92 at step (2). In step (3) magnetic forces F attract the stator 92 towards the rotor 93 and the stator 92 is fixed into position by means of a fixation point 923. Finally, the shim 94 is removed at step (4), leaving an airgap 95.

There is a constant attraction force between rotor and the stator due to the iron core in the stator, which may cause the rotor and stator to move towards each other, thereby reducing or closing the airgap. Proper fixation of both the stator and the rotor along the y-axis is therefore necessary to prevent movement of either part. Despite this however, airgap closure may occur, leading to complete loss of function of the motor. For example, closing of the airgap may be caused by any one or more of the following:
  the magnetic attraction forces;
  user loading; and/or
  insufficient fixation of the stator or rotor due to:
    creep in plastic parts of the drivetrain;
    slip in screw connections; or
    drop, leading to plastic deformation of components.

It is therefore desirable to maintain and prevent closure of the airgap to ensure proper functioning of the motor.

Figure 3:
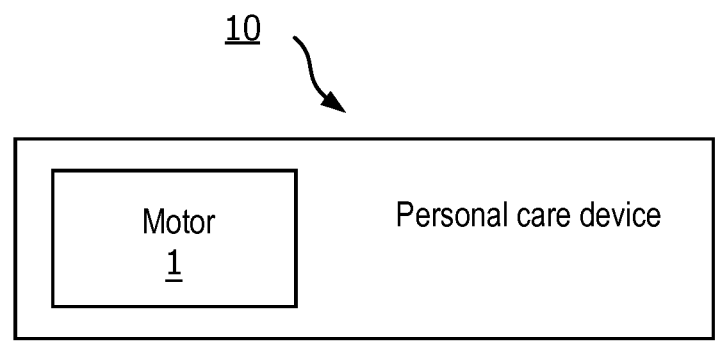
FIG. 3 is a block diagram of a personal care device according to a general embodiment of an aspect of the invention.

FIG. 3 is a block diagram of a personal care device according to a general embodiment of an aspect of the invention. The personal care device 10 comprises a motor 1, according to embodiments of the present invention. The personal care device 10 may, for example be an oral care device, such as a power toothbrush, or may be a power shaver or a skin care device, such as a skin massager, or other type of personal care device.

Figure 4:
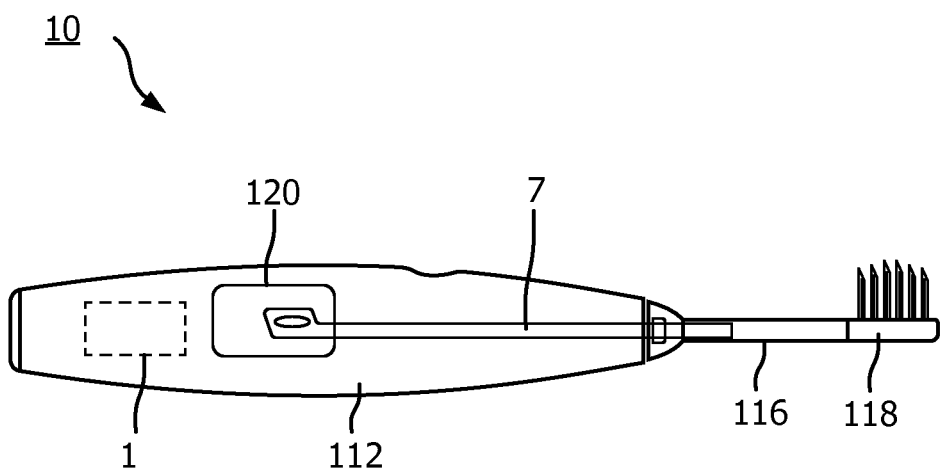
FIG. 4 is a diagram of a power toothbrush to which embodiments of aspects of the present invention may be applied.

FIG. 4 shows an exemplary personal care device in which the teaching of the present disclosure may be implemented. The personal care device in FIG. 4 is in the form of an electric toothbrush (power toothbrush), but it will be appreciated that this is not limiting, and the teaching of the present disclosure may be implemented in other devices comprising a motor. For example the teachings may be applied to personal care devices such as tongue cleaners, shavers, hair clippers or trimmers, hair removal devices, or skin care devices. The personal care device 10 has an attachment structure 116 and a handle portion 112. The handle portion has a motor 1. The handle 112 may include a drive train 120 and a drive shaft 7. The drive shaft 7 extends from a distal end f the handle 112, and into the attachment structure 116 when an attachment structure 16 is attached to the handle 112.

Motor 1 may comprise a motor controller (i.e., control electronics) which may be any suitable controller, microcontroller, processor, power source and/or other electronics to provide power and control signals for implementing the various functions, or any combination thereof, as discussed further herein.

In embodiments, motor 1 may be configured for providing and controlling an operation or operations of the drive train 120 to produce a mechanical stimulus. The mechanical stimulus may comprise vibrations or other movements at a high frequency, for example, a frequency greater than 50 Hz, and for example a frequency in the range of 250-300 Hz. The motor 1 may be a motor according to embodiments of the present invention.

With reference still to FIG. 4, the distal end of attachment structure 116 includes brush head 118. However, it can be appreciated that different types of attachment structures and devices can be used with different types of personal care devices 10 other than the electric toothbrush shown in the example in FIG. 4.

In operation, responsive to the motor 1 operating to control an operation of the drive train 120 to produce a mechanical stimulus the attachment structure 116 implements a motion.

Figure 5A:
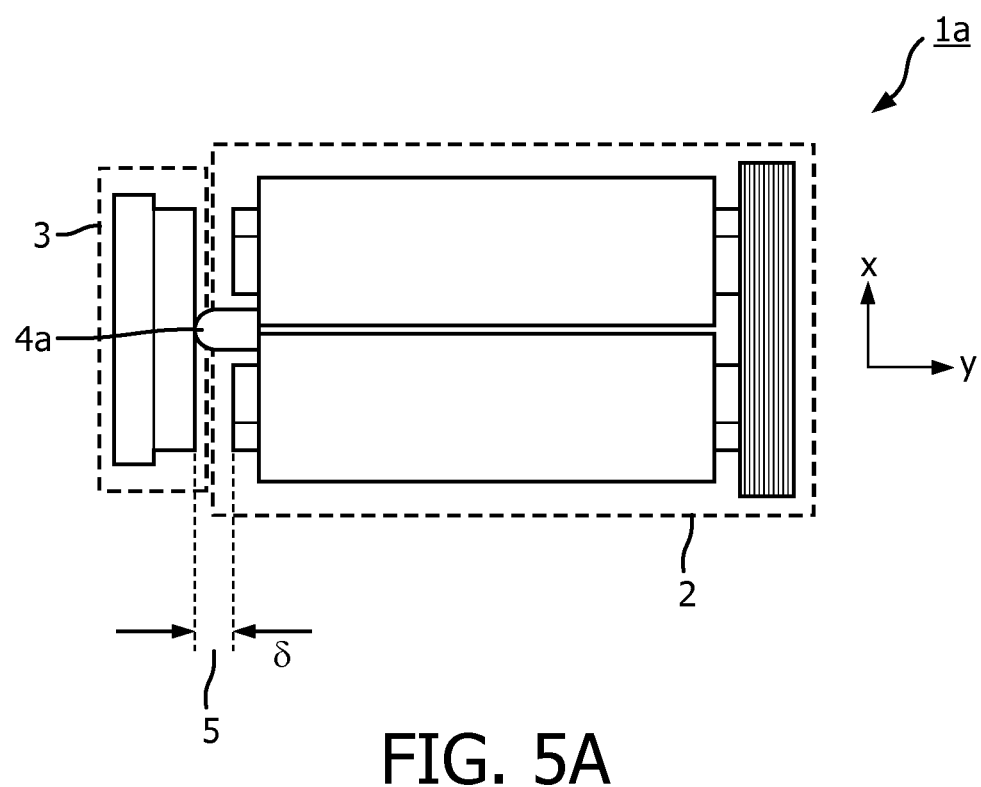
FIG. 5A is a diagram of a motor according to a general embodiment of an aspect of the invention.
Figure 5B:
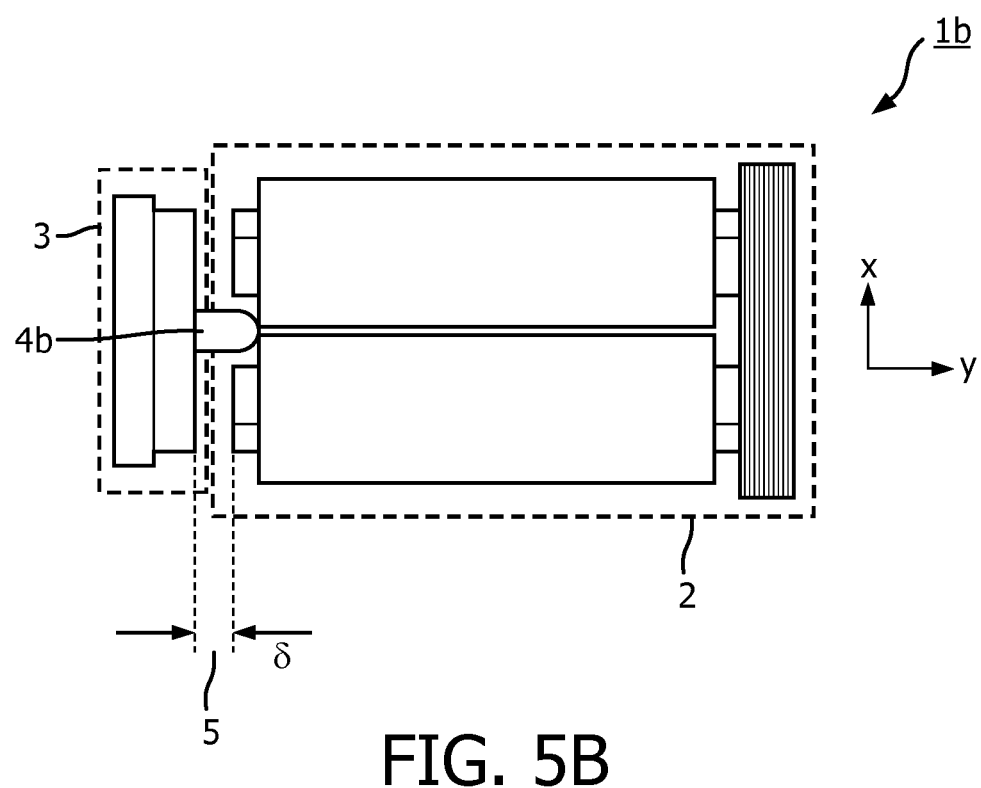
FIG. 5B is a diagram of a motor according to a general embodiment of an aspect of the invention.

FIGS. 5A and 5B show alternative arrangements according to a general embodiment of an aspect of the invention. Both figures show a motor 1 comprising a stator 2 and a rotor 3, with a spacer 4 disposed between them to define a minimum airgap 5. In FIG. 5A, the motor 1a has a spacer 4a is disposed on a stator surface and is configured to engage (i.e. contact) with a surface of the rotor 3. Conversely, the motor 1b in FIG. 5B has a spacer 4b disposed on a rotor surface and is configured to engage (i.e. contact) with a surface of the stator 2. Accordingly, in each arrangement, the spacer 4 defines a minimum distance between the rotor 3 and the stator 2, corresponding to a desired airgap. The defined airgap 5 is maintained by the spacer 4, such that the minimum size of the airgap 5 is determined by the size of the spacer 4 in the y-direction.

A contact surface of the spacer 4 is configured to engage with or contact the rotor surface or the stator surface. However, it is also possible for there to be no contact between the contact surface of the spacer and the stator surface or the rotor surface, such that the spacer 4 is disposed on or at one of the rotor surface and the stator surface, and is separated from the other one of the rotor surface and the stator surface. For example, the spacer may be disposed on the stator surface and configured to engage with the rotor surface, yet may not actually engage with or contact the rotor surface and a gap may be provided between the spacer and the rotor. Similarly, the spacer may be disposed on the rotor surface and configured to engage with the stator surface, yet may not actually engage with or contact the stator surface and a gap may be provided between the spacer and the stator. The spacer is therefore still provided to prevent closure of the airgap but, since it is not initially contacting the rotor surface or stator surface, may be considered as a 'back-up' in the event of the rotor and stator moving towards each other due to, for example, failure/creep of parts or fixings, or an impact on the motor due to, for example, dropping of the device.

Figure 6:
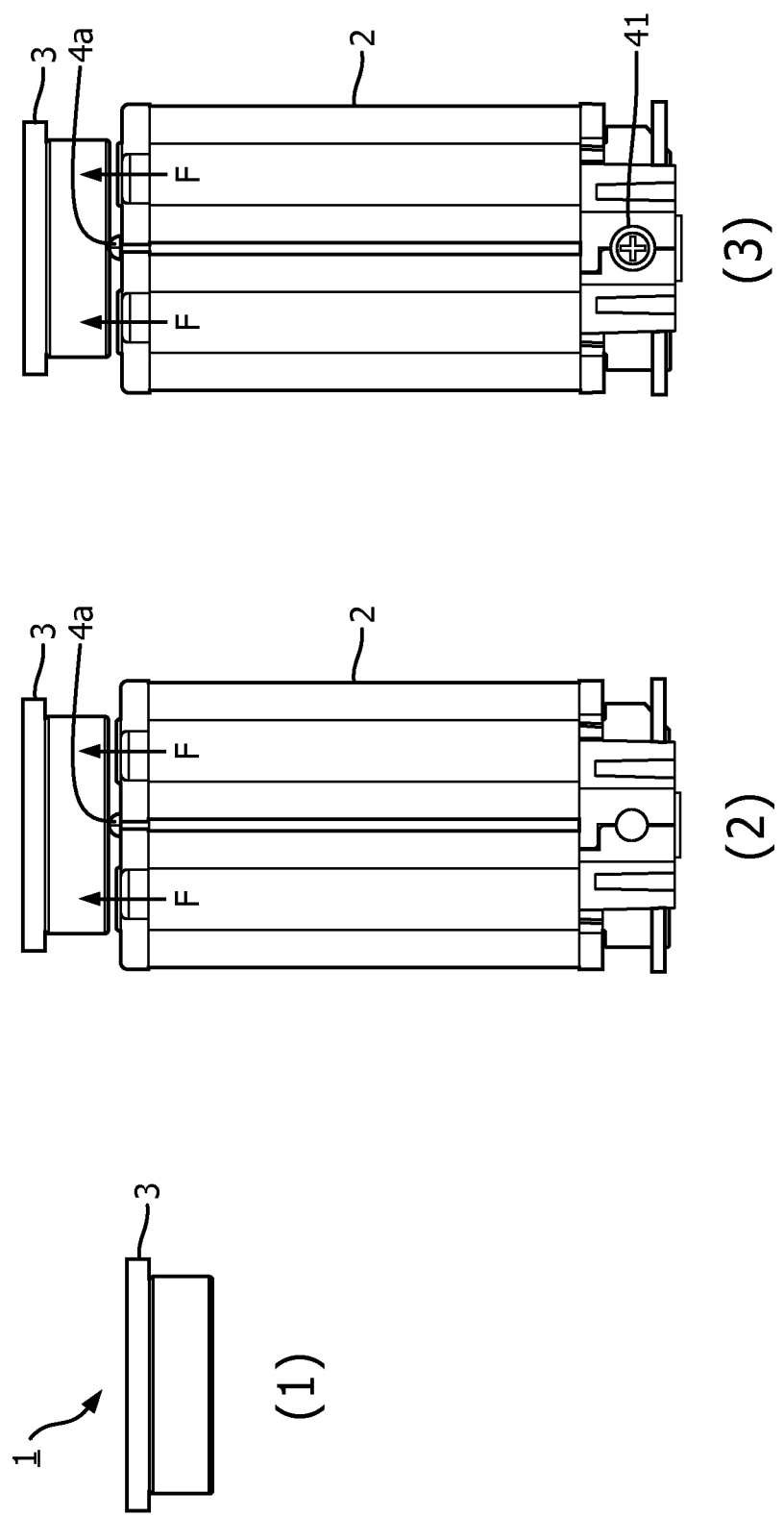
FIG. 6 is a diagram of a manufacturing method according to a general embodiment of another aspect of the invention.

FIG. 6 shows a method of manufacturing the motor according to a general embodiment of an aspect of the present invention. As shown in step (1), the rotor 3 is mounted in the motor. The stator 2 is positioned in the motor in step (2). A magnetic force F between the rotor 3 and the stator 2 causes the stator 2 and rotor 3 to be brought together at an interface area, at which the spacer 4a is disposed between the stator 2 and the rotor 3. The spacer 4a therefore prevents the stator 2 and the rotor 3 coming into direct contact, at any point other than at a contact region of the spacer 4a. In step (3), the stator 2 is fixed into position in the motor at a fixation point 41. Any suitable fixation means may be used, such as, for example, screws or bolts. It may be seen from the method of manufacturing that means for setting the airgap is explicitly present in the motor itself and is provided by the spacer.

The spacer 4a is disposed on the stator 2 in the arrangement shown in FIG. 6. However, as discussed above with reference to FIG. 5B, the spacer may alternatively be disposed on the rotor 3. The method of manufacturing the motor is the same for both arrangements.

Figure 7:
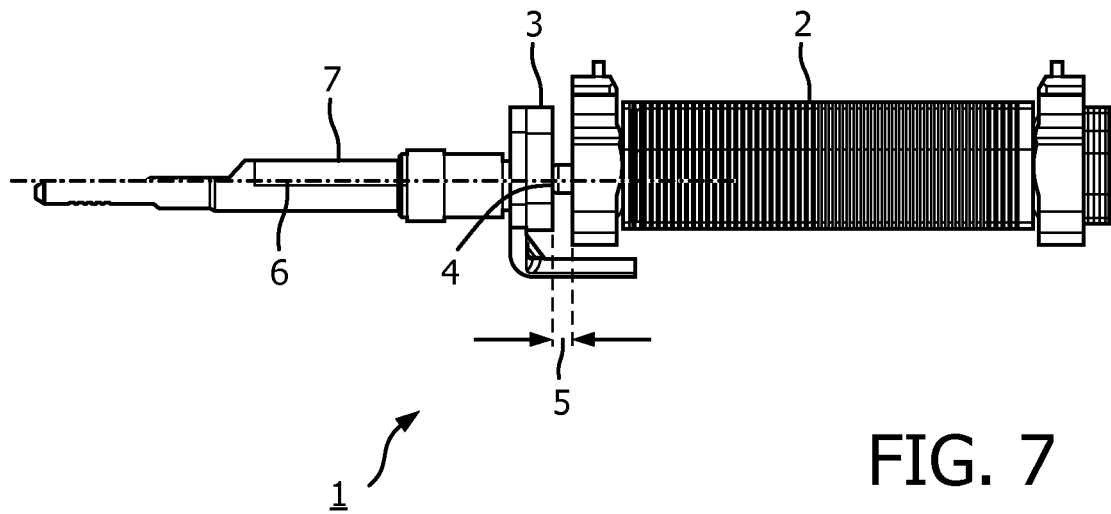
FIG. 7 is a side view of a drivetrain comprising the motor according to an embodiment of an aspect of the invention.

FIG. 7 is a side view of a drivetrain comprising the motor according to an embodiment of an aspect of the invention. The drivetrain comprises an output shaft 7 and a motor 1, which includes a rotor 3, a stator 2 and a spacer 4 disposed between the rotor 3 and the stator 2 to define a minimum airgap 5. The drivetrain may comprise further elements which are not required for the understanding of embodiments of the present invention and so are not included in the figures.

Figure 8:
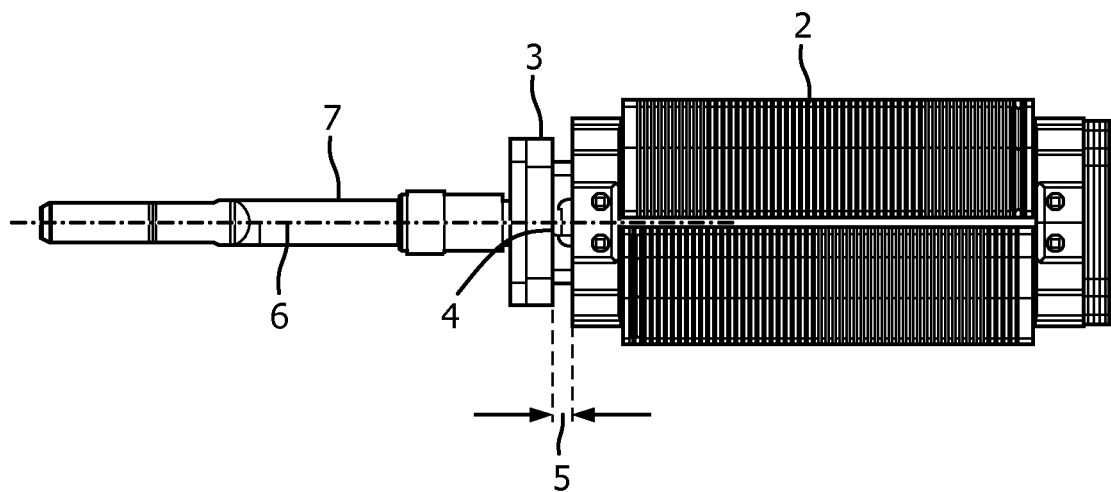
FIG. 8 is a top view of the drivetrain of FIG. 7.

In this embodiment, a rotation axis 6 of the rotor 3, about which the rotor 3 may rotate, is aligned with the spacer 4. The output shaft 7 of the drivetrain is also aligned with the rotation axis 6. This may also be seen in FIG. 8 which is a top view of the drivetrain shown in FIG. 7. Alignment of the spacer projection 4 with the rotation axis 6 may minimize the contact area between the spacer 4 and the surface of the rotor 3 or stator 2, and also reduce the friction between the spacer 4 and surfaces of the rotor 3 or stator 2.

Figure 9:
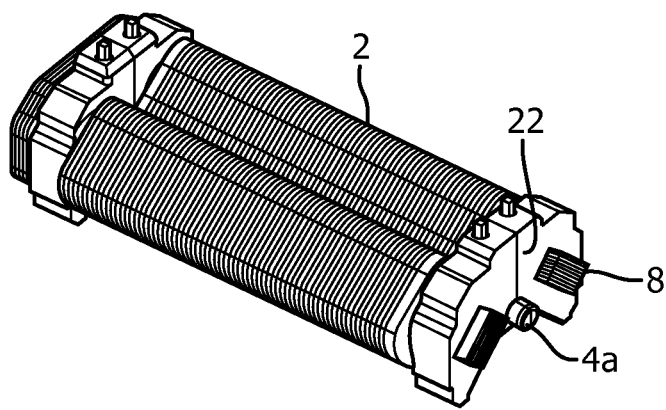
FIG. 9 is a perspective view of a stator according to an embodiment of an aspect of the invention.

FIG. 9 is a perspective view of a stator 2 according to an embodiment of an aspect of the invention. The stator 2 may be the stator 2 shown in the drivetrain of FIGS. 7 and 8. The stator 2 comprises two iron cores each comprised of a plurality of laminations 8. Windings are provided around each core to provide two coils. A spacer 4a is disposed on the stator surface 22 such that it projects from the stator surface 22. The ends of the laminations 8 may also project from the end surface of the stator but the projection of the ends of the laminations is not as large as that of the spacer 4a (i.e. the laminations do not project as far out of the surface of the stator and the spacer 4a projects further) so that the ends of the laminations 8 do not contact the rotor 3. The airgap is generally defined as the distance between the stator and the rotor. If the stator is provided with laminations and the ends of these laminations project from the end surface of the stator, then the airgap may be defined as the distance between the ends of the laminations and the rotor (for example, a magnet of the rotor), i.e. the airgap is the shortest distance between components of the stator and components of the rotor (other than the spacer).

The spacer 4a has a circular top shape at the contact surface, in order to minimise the contact area between the spacer and the rotor. Furthermore, the spacer 4a may be made out of a material which is both wear resistant and has low coefficient of friction, in order to further reduce the friction between the spacer 4a and the rotor surface. The working principle of the drivetrain is not affected by the presence of the spacer 4a.

In this embodiment, the stator surface 22 is the end of the stator body, which may be a bobbin which holds the two cores, and the spacer 4a is formed on the end of the bobbin. However, as discussed above, and as will be evident from the example arrangements described below, the stator surface may vary depending on the configuration of the stator and the formation or positioning of the spacer may also vary.

Figure 10:
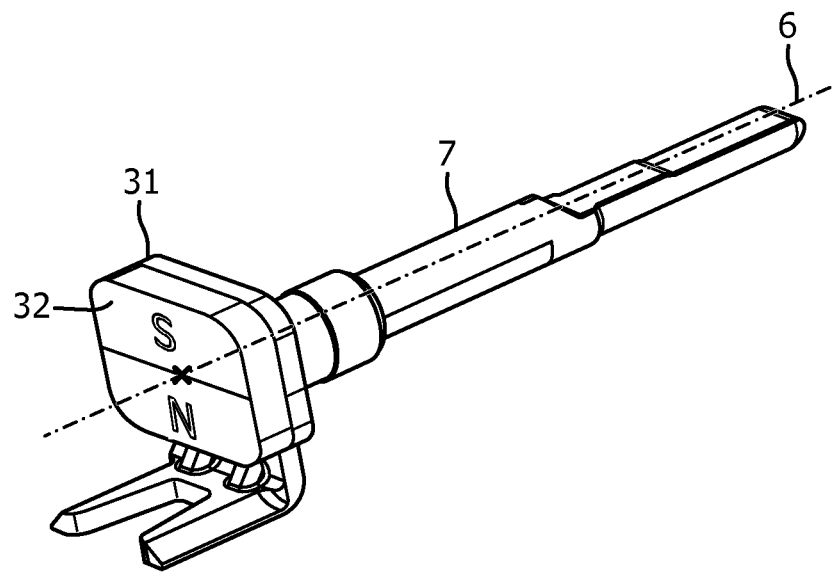
FIG. 10 is a perspective view of a rotor according to an embodiment of an aspect of the invention.

FIG. 10 is a perspective view of a rotor 3 according to an embodiment of an aspect of the invention. The rotor 3 may be the rotor 3 shown in the drivetrain of FIGS. 7 and 8. The rotor 3 comprises a magnet 31 and an output shaft 7 of the drivetrain is connected to the rotor 3. The rotor 3 and the shaft 7 rotate about a rotation axis 6, such that the rotation axis 6 runs through the length of the output shaft 7. In this embodiment, the rotor surface 32 is provided as a surface of the magnet 31 and the spacer is not disposed on the rotor surface. Thus the spacer will be disposed on the stator surface and the contact surface of the spacer will engage with and contact the rotor surface 32 (the surface of the magnet 31). The spacer may preferably contact the rotor surface 32 at a center point which is aligned with the rotation axis 6 of the rotor 3, such that the spacer coincides with the axis of rotation.

Figure 11:
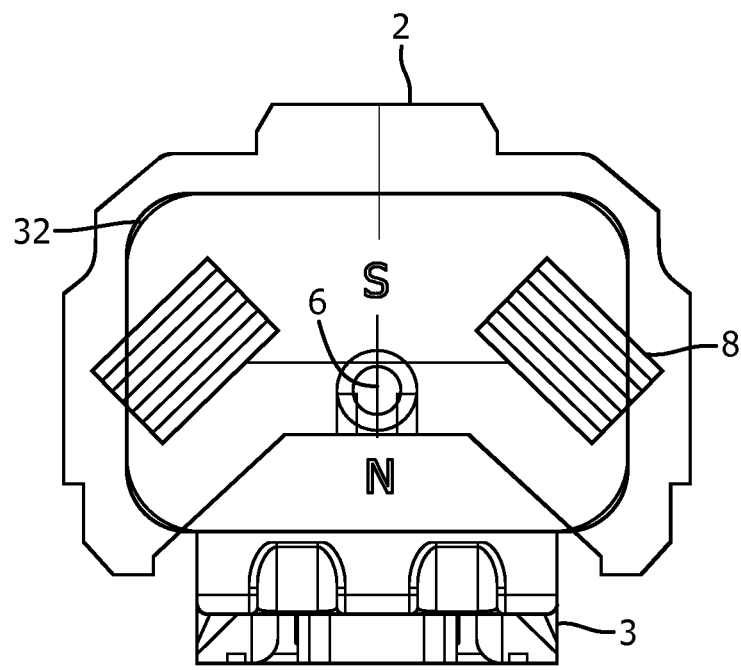
FIG. 11 is an end view of a motor according to an embodiment of an aspect of the invention.

FIG. 11 is an end view of a motor 1 according to an embodiment of an aspect of the invention. This motor may be the motor shown in FIGS. 7 and 8 and may utilise the stator shown in FIG. 9 and the rotor shown in FIG. 10. The ends of the laminations 8 are shown either side of the rotation axis 6 and the magnet 32 of the rotor comprises a north N and south S pole.

Figure 12:
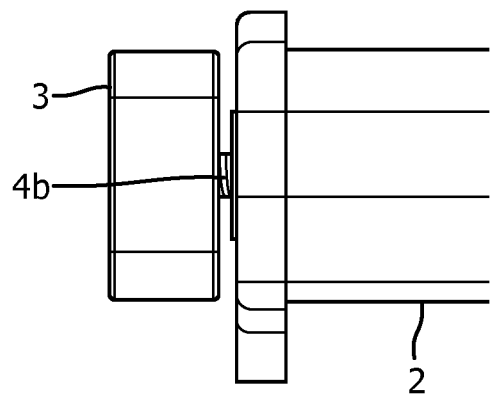
FIG. 12 is a side view of a motor according to an embodiment of an aspect of the invention.

FIG. 12 is a side view of a motor according to an embodiment of an aspect of the invention. In this embodiment the spacer 4b is disposed on the rotor 3, and is configured to engage with the stator 2. The rotor 3 may be provided with a magnet and the spacer 4b may be disposed on a surface of the magnet which provides the rotor surface.

Figure 13:
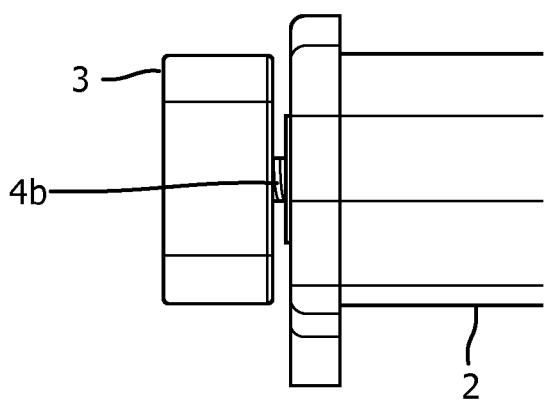
FIG. 13 is a side view of a motor according to an embodiment of an aspect of the invention.
Figure 14:
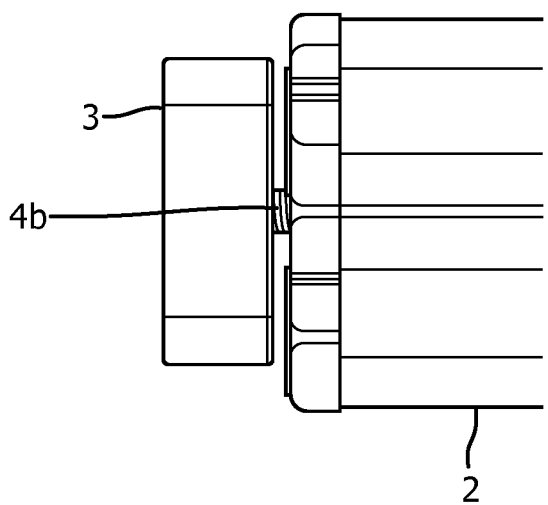
FIG. 14 is a top view of a motor according to an embodiment of an aspect of the invention.

FIGS. 13 and 14 show views of another embodiment in which the spacer 4b is provided on the rotor surface of the rotor 3. It may be seen that the spacer is aligned with the rotation axis of the rotor 3.

Figure 15:
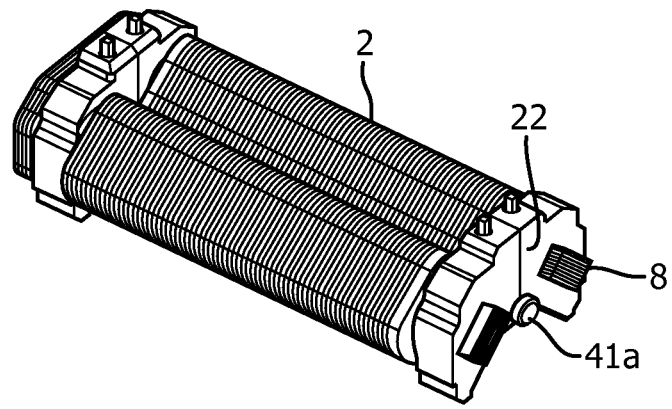
FIG. 15 is a perspective view of a stator according to an embodiment of an aspect of the invention.

FIG. 15 is a perspective view of an arrangement of the stator according to an embodiment of an aspect of the invention. The stator 2 comprises a ball bearing 41a disposed on the stator surface 22 of the stator 2. The ball bearing 41a provides the spacer such that a surface of the ball bearing 41a is the contact surface configured to engage with a surface of the rotor, such as, for example a magnet surface. The ball bearing 41a is arranged in a collar or socket of the stator 2. The ball bearing 41a sits within the collar/socket and freely rotates with respect to the stator 2 and the rotor. Friction between the ball bearing 41a, stator 2 and rotor may therefore be reduced.

Figure 16A:
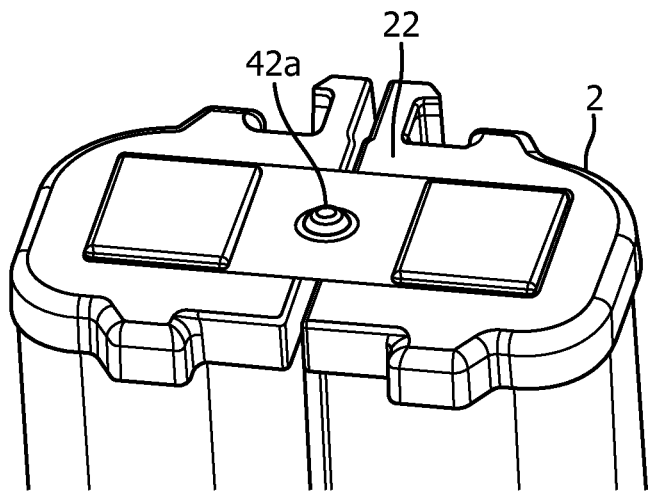
FIG. 16A is a perspective view of a stator according to an embodiment of an aspect of the invention.
Figure 16B:
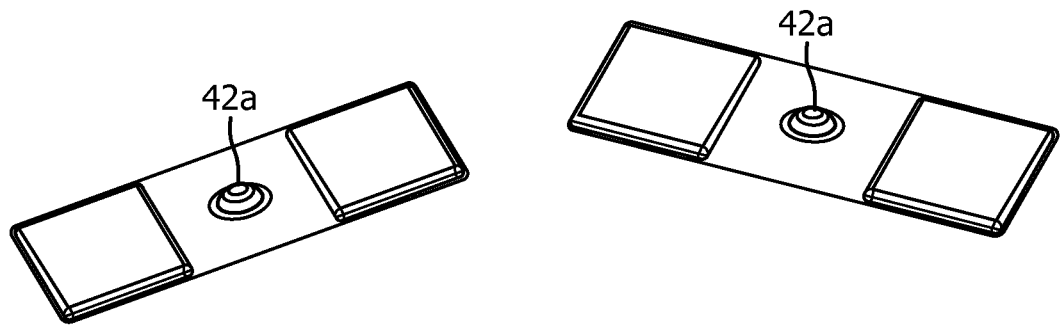
FIG. 16B shows perspective views of a spacer element of the stator shown in FIG. 16A.

FIGS. 16A and 16B show a perspective view of an arrangement of the stator according to an embodiment of an aspect of the invention. In this arrangement, the spacer 42a is provided on a plate which is configured to connect to the stator surface 22 of the stator 2 and, more specifically, with the ends of the laminations 8 of the stator 2. That is, the plate comprising the spacer 42a is installed directly onto the lamination ends 8. In this arrangement, the stator surface 22 may be seen as being made up of the lamination ends 8 and the body of the stator 2 (for example, the bobbin). The spacer 42a may be considered as a bearing centrally located in the plate which is configured to engage with the lamination ends 8. The plate may be attached to the stator using any suitable fixation means, such as, for example, adhesive.

Such an arrangement is simple to manufacture, easy to test and does not require any tool changes if being applied to an existing motor design. The ends of the laminations may protrude slightly from the stator body in order for the plate to be attached, however, the protrusion will not be as large as the protrusion of the spacer 42a from the plate. The plate may be a stamped, non-ferrous (for example, brass) part located on the end face of the laminations, allowing for tight tolerance control in the y-direction. The plate may not contact the stator body, such that the plate may span across, as a simply supported beam, the two ends of the laminations and bridge the stator body between the lamination ends. The material of the plate must be stiff enough to support a thrust load without deforming. The spacer 42a (bearing point) is just proud of the lamination face.

Figure 17A:
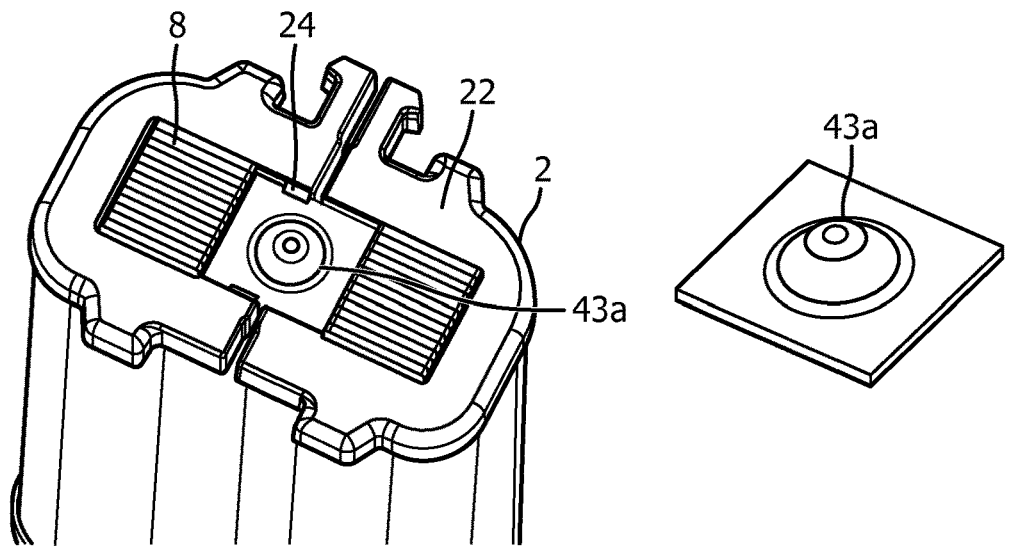
FIG. 17A is a perspective view of a stator and a spacer element according to an embodiment of an aspect of the invention.
Figure 17B:
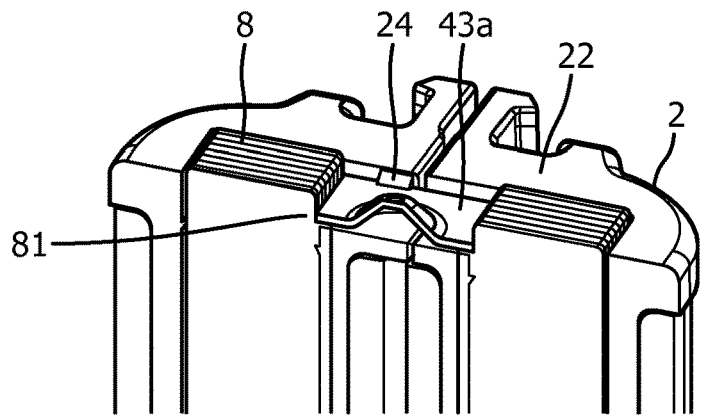
FIG. 17B shows further views of the stator shown in FIG. 17A.
Figure 17B:
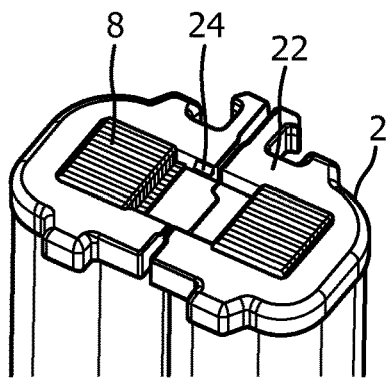
Figure 17B:
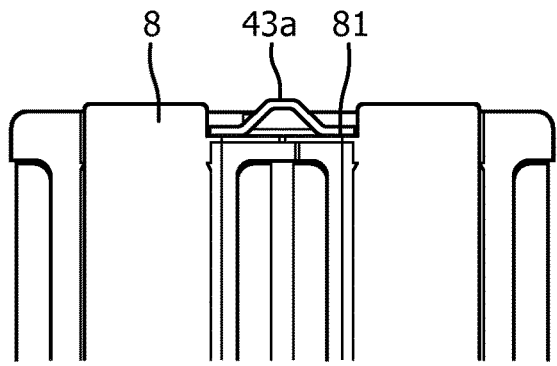

FIGS. 17A and 17B show an arrangement of the stator and spacer element according to an embodiment of an aspect of the invention. In this arrangement the spacer 43a is provided on a plate which is configured to connect to the stator surface 22 and, more specifically, to a recess provided in the stator body. That is, the stator surface 22 is shaped to receive and retain a plate comprising the spacer 43a. The plate may be retained in the recess by crush ribs or snaps 24 located at the outer edge of the recess. The recess comprises a step 81 on each of the lamination ends 8, upon which the plate sits when retained in the recess. In this arrangement, the stator surface 22 may be seen as being made up of the body of the stator 2 (for example, the bobbin) and the stepped ends of the laminations 81.

Such an arrangement is simple to manufacture, secure, resilient and provides good tolerances. The step 81 on each of the lamination ends is provided with tight tolerance control. The plate may be a stamped, non-ferrous (for example, brass) part located on the step 81, allowing tight tolerance control in the y-direction. The spacer 43a (bearing point) is just proud of the lamination face. Diagram (3) in FIG. 17B shows that the lamination ends 8 protrude above the level of the body of the stator, and the spacer 43a by a greater amount above the surface. Crush ribs or snaps are added to the recess to retain the plate, which minimises vibration and noise.

Figure 18A:
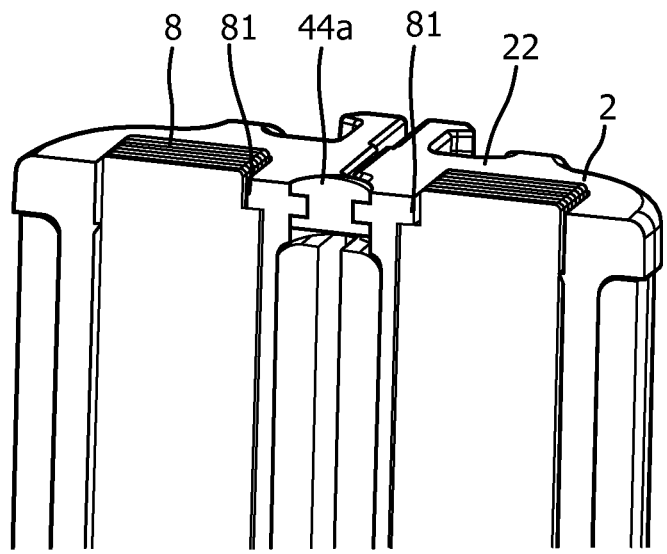
FIG. 18A is a perspective view of a stator according to an embodiment of an aspect of the invention.
Figure 18B:
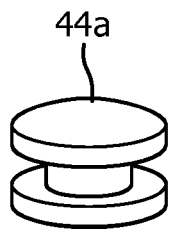
FIG. 18B is a perspective view of a spacer element of the stator shown in FIG. 18A.
Figure 18C:
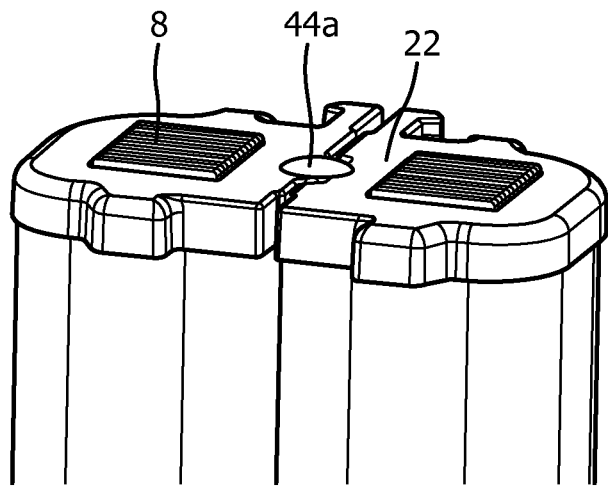
FIG. 18C is a perspective view of the stator shown in FIG. 18A.

FIGS. 18A to 18C show a perspective view of an arrangement of the stator according to an embodiment of an aspect of the invention. In this arrangement the spacer 44a is provided as a part retained in the end of the stator body by a collar. It may be seen in FIG. 18A that the stator surface 22 is shaped to receive and retain the spacer part 44a. The spacer part 44a is shaped to engage with the stator surface 22 such that the spacer 44a is retained in the stator 2. The ends of the laminations 8 are each provided with a step 81 to receive the stator body, and allow for a thicker part of the stator body surrounding the spacer 44a so that the spacer 44a is securely retained. In this arrangement, the stator surface 22 may be seen as the body of the stator 2 (for example, the bobbin).

The step 81 on each of the lamination ends is provided with tight tolerance control. The stator body (for example, bobbin) engages with the step, allowing for tight tolerance control in the y-direction. The spacer part may be a screw-machined, non-ferrous (for example, brass) part which provides the spacer (bearing point) and is assembled between the stator body, which may comprise two complementary bobbins (bobbin halves). The spacer 44a (bearing point) is just proud of the lamination face.

Figure 19A:
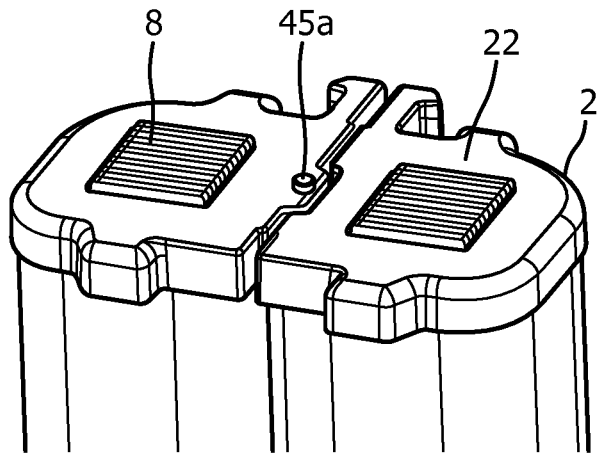
FIG. 19A is a perspective view of a stator according to an embodiment of an aspect of the invention.
Figure 19B:
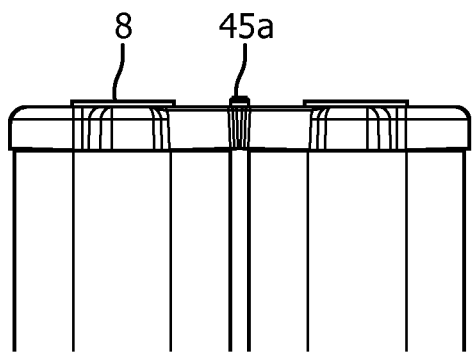
FIG. 19B is a side view of the stator shown in FIG. 19A.
Figure 19C:
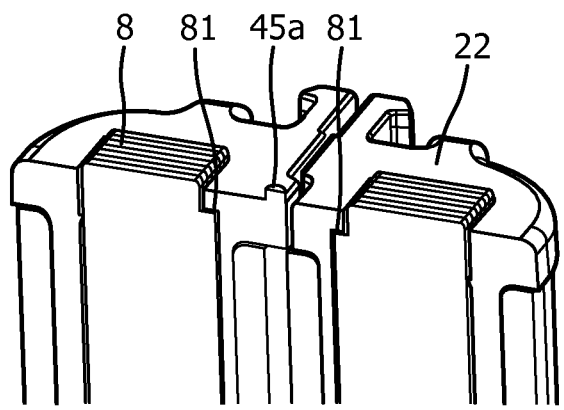
FIG. 19C is a perspective view of the stator shown in FIG. 19A.

FIGS. 19A to 19C show a perspective view of an arrangement of the stator according to an embodiment of an aspect of the invention. In this arrangement the spacer 45a is provided on the stator surface 22 and, more specifically, is moulded in the stator body. The stator body may be a bobbin and the spacer 45a may be formed as part of the bobbin such that is projects from a surface of the bobbin. In this arrangement, the stator surface 22 may be seen as the surface of the stator body, i.e. the bobbin surface. The ends of the laminations 8 are each provided with a step 81 to receive the stator body, and to improve tolerances.

The spacer 45a is formed from the same material as the stator body (bobbin) and so suitable materials for the stator body are therefore also used to provide the spacer 45a. This arrangement does not require any additional parts and so is a low cost arrangement. The step 81 on each of the lamination ends is provided with tight tolerance control. The stator body (for example, bobbin) engages with each step 81, allowing for tight tolerance control in the y-direction. The spacer 45a is moulded into the bobbin. The spacer 45a (bearing point) is just proud of the lamination face.

Figure 20A:
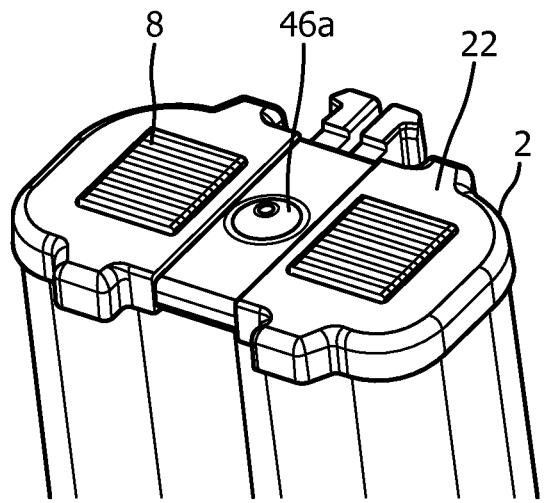
FIG. 20A is a perspective view of a stator according to an embodiment of an aspect of the invention.
Figure 20B:
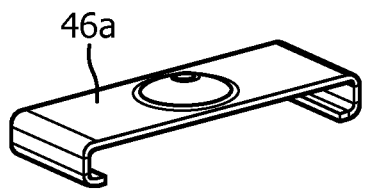
FIG. 20B is a perspective view of a spacer element of the stator shown in FIG. 20A.
Figure 20C:
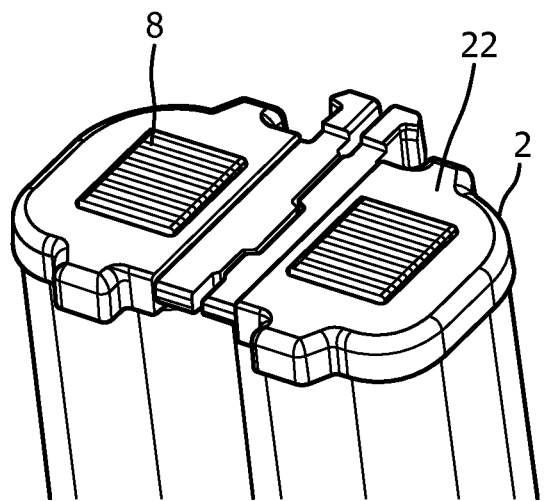
FIG. 20C is a perspective view of the stator shown in FIG. 20A.

FIGS. 20A to 20C show an arrangement of the stator according to an embodiment of an aspect of the invention. In this arrangement the spacer 46a is provided on a strap which is configured to connect to the stator surface 22 and, more specifically, to a recess provided in the stator body. That is, the stator surface 22 is shaped to receive and retain a strap comprising the spacer 46a. The ends of the strap are curved to engage with the ends of the stator body such that the ends of the strap may wrap around the edge of the stator body and the strap may be retained in the recess. The ends of the laminations 8 are each provided with a step 81 to receive the stator body, and allow for a part of the stator body to be present underneath the strap so that the spacer 44a may be securely retained. In this arrangement, the stator surface 22 may be seen as the body of the stator 2 (for example, the bobbin).

The step 81 on each of the lamination ends is provided with tight tolerance control. The stator body (for example, bobbin) engages with the step 81, allowing for tight tolerance control in the y-direction. The strap may be a stamped, non-ferrous (for example, brass) part disposed on the stator surface and assembled between the stator body, which may comprise two complementary bobbins (bobbin halves). The spacer 46a (bearing point) is just proud of the lamination face.

Figure 21A:
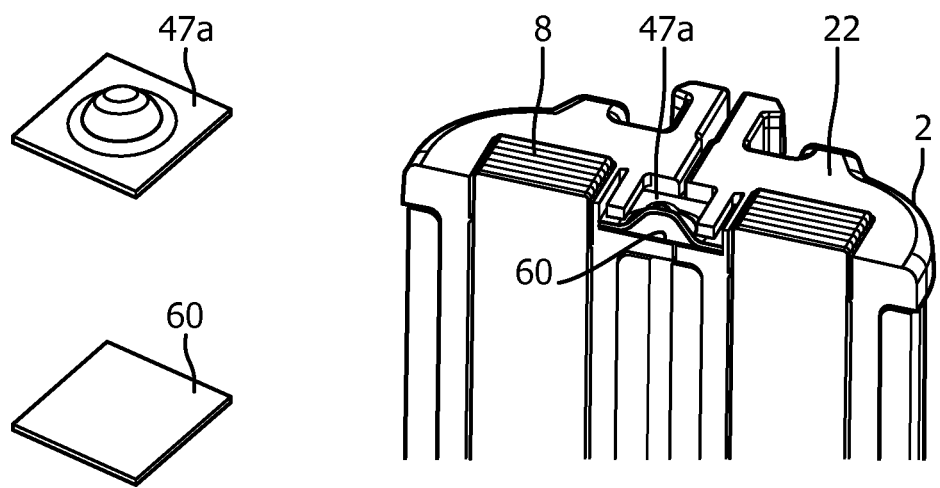
FIG. 21A is a perspective view of a stator and spacer element according to an embodiment of an aspect of the invention.
Figure 21B:
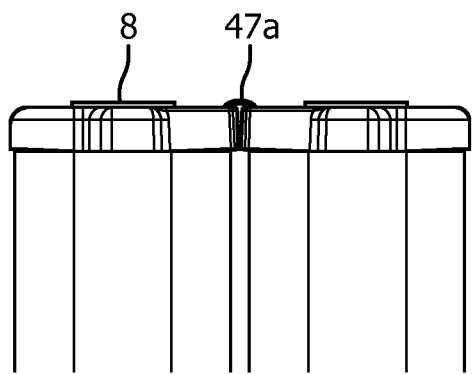
FIG. 21B is a side view of the stator shown in FIG. 21A.
Figure 21C:
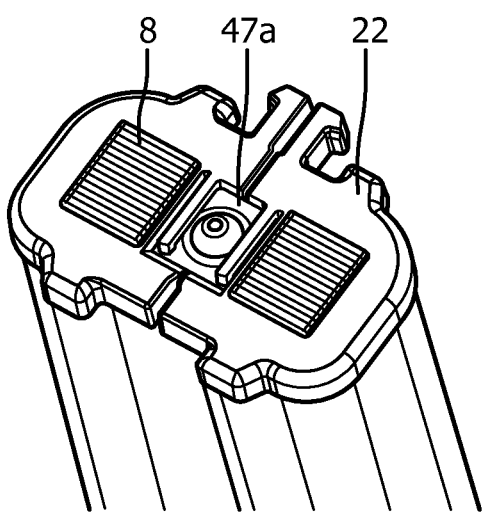
FIG. 21C is a perspective view of the stator shown in FIG. 21A.

FIGS. 21A to 21C show an arrangement of the stator and spacer element according to an embodiment of an aspect of the invention. In this arrangement the spacer 47a is provided on a plate which is configured to connect to the stator surface 22 and, more specifically, to a recess provided in the stator body. That is, the stator surface 22 is shaped to receive and retain a plate comprising the spacer 47a. One or more shims 60 may be provided under the spacer plate to achieve the desired protrusion height of the spacer 47a. The stator body may comprise arms to retain the spacer plate in the recess. In this arrangement, the stator surface 22 may be seen as the body of the stator 2 (for example, the bobbin).

This arrangement requires minimal tooling changes and does not alter the magnetic circuit of the motor. The stator body (bobbin) is shaped to receive and secure the spacer plate. The plate may be a stamped, non-ferrous (for example, brass) sheet disposed on the stator surface 22 and assembled between the stator body, which may comprise two complementary bobbins (bobbin halves). Shims 60 may be provided between the stator body and the spacer 47a to raise the spacer 47a (bearing point) so that it is just proud of the lamination face.

Figure 22A:
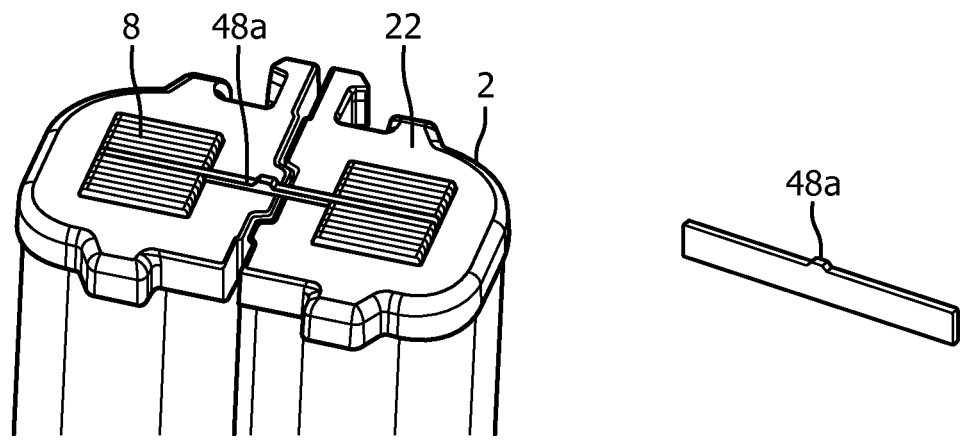
FIG. 22A is a perspective view of a stator and spacer element according to an embodiment of an aspect of the invention.
Figure 22B:
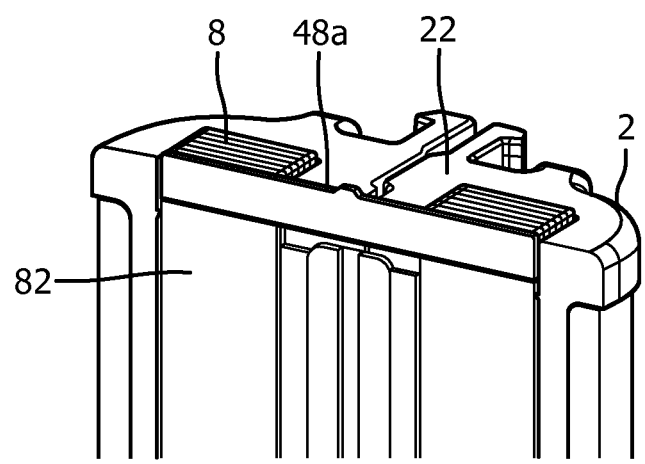
FIG. 22B is a perspective view of the stator shown in FIG. 22A.

FIGS. 22A and 22B show an arrangement of the stator and spacer element according to an embodiment of an aspect of the invention. In this arrangement the spacer 48a is provided on a strip which is configured to connect to the stator surface 22 and, more specifically, to a channel provided in the stator body and the laminations 8. That is, the stator surface 22 and the lamination cores 8 are shaped to receive and retain a strip comprising the spacer 48a. The channel in the stator body runs between the two laminated cores 8 and a shortened lamination 82 is provided in each core 8. The shortened laminations are aligned with the channel in the stator body such that the channel continues through the laminated cores 8. The height of the body of the strip corresponds to the depth of the channel in the laminated cores 8, such that the top edge of the strip is flush with the ends of the laminations 8 (other than the shortened laminations 82) when the strip is retained in the channel. The spacer 48a projects from the top edge of the strip and is located between the two laminated cores 8.

The strip of this arrangement may be made of one of a number of different materials thus providing more material options. The shortened laminations 82 may be centrally located in their respective cores 8. The plate may be a stamped, non-ferrous (for example, brass) sheet disposed in the channel, on top of the shortened laminations 82, ensuring good y-direction tolerance control. The spacer 48a (bearing point) is just proud of the lamination face.

Figure 23:
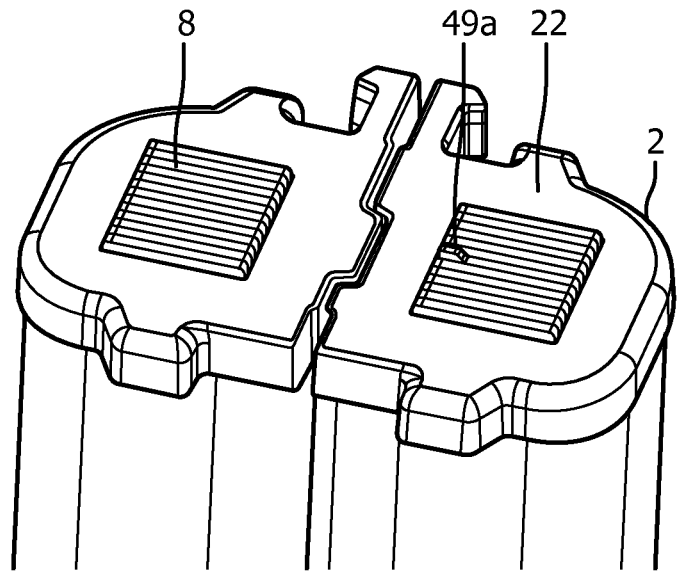
FIG. 23 is a perspective view of a stator according to an embodiment of an aspect of the invention.

FIG. 23 is a perspective view of a stator according to an embodiment of an aspect of the invention. In this arrangement, the spacer 49a is provided as a protrusion extending from the end of one of the laminations in the laminated core 8. The stator surface 22 in this arrangement may be seen as the end of the laminated core 8.

One or more of the laminations of the laminated core 8, such as the center lamination, are replaced by a lamination that includes a protrusion that provides the spacer 49a. Since the projection is provided on a lamination of the core, several material options are available. No further parts are required and so this is a low cost arrangement. Y-direction tolerances are controlled by the tight tolerances of the spacer 49a (bearing) lamination stamping. The spacer 49a lamination may be a ferrous or non-ferrous material, with a balance of bearing properties and magnetic properties. The spacer 49a (bearing point) is just proud of the lamination face.

Figure 24:
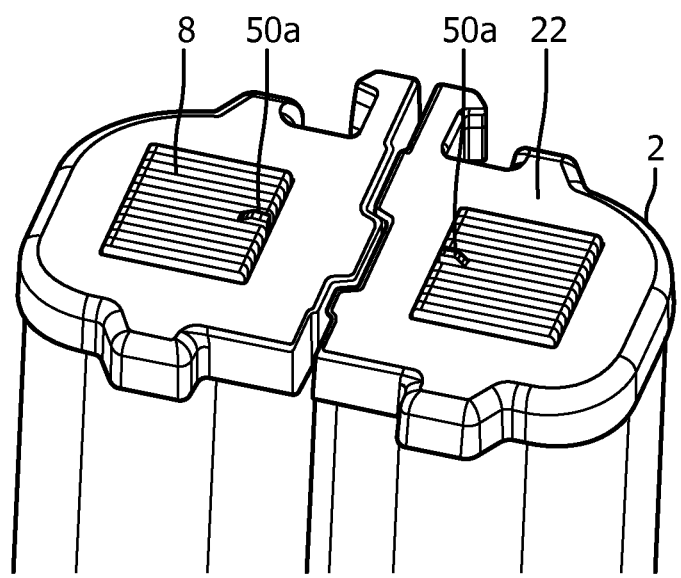
FIG. 24 is a perspective view of a stator according to an embodiment of an aspect of the invention.

FIG. 24 is a perspective view of an arrangement of the stator according to an embodiment of an aspect of the invention. This arrangement is the same as the arrangement in FIG. 23, except a lamination with a projection is provided in each of the two cores 8, so as to provide two spacers 50a. Thus, one or more of the laminations of each of the laminated cores, such as the center lamination, are replaced by a lamination that includes a protrusion that acts as a spacer 50a at each core end. The stator surface in this arrangement may be seen as comprising both ends of the laminated cores 8.

Similarly to the arrangement in FIG. 23, several material options are available because the projection is provided on a lamination of each of the cores. No further parts are required and so this is a low cost arrangement. Y-direction tolerances are controlled by the tight tolerances of each spacer 50a (bearing) lamination stamping. Each spacer 50a lamination may be a ferrous or non-ferrous material, with a balance of bearing properties and magnetic properties. Each spacer 50a (bearing point) is just proud of the lamination face.

As may be seen from the above, embodiments of the present invention may prevent airgap closure by explicitly setting the minimum airgap with a spacer projecting between the stator and the rotor. Furthermore, the requirement for a shimming procedure during assembly may be avoided. The spacer may prevent the magnets of the rotor and coils of the stator from moving closer together. The spacer may set the airgap during assembly and control the airgap during its lifetime. For example, if the stator or rotor are not properly fixed, the spacer prevents the airgap from closing by providing a projection between the stator and rotor. It may therefore be seen as fallback scenario to prevent the airgap from closing completely.

Although only a few exemplary embodiments have been described in detail above, those skilled in the art will readily appreciate that many modifications are possible in the exemplary embodiments without materially departing from the novel teachings and advantages of the embodiments of the present disclosure. The above-described embodiments of the present invention may advantageously be used independently of any other of the embodiments or in any feasible combination with one or more others of the embodiments.

Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

In addition, any reference signs placed in parentheses in one or more claims shall not be construed as limiting the claims. The word "comprising" and "comprises," and the like, does not exclude the presence of elements or steps other than those listed in any claim or the specification as a whole. The singular reference of an element does not exclude the plural references of such elements and vice-versa. One or more of the embodiments may be implemented by means of hardware comprising several distinct elements. In a device or apparatus claim enumerating several means, several of these means may be embodied by one and the same item of hardware. The mere fact that certain measures are recited in mutually different dependent claims does not indicate that a combination of these measures cannot be used to an advantage.

The invention claimed is:

1. A motor for a personal care device, the motor comprising:
   a stator comprising a stator surface;
   a rotor comprising a rotor surface disposed opposite the stator surface; and
   a spacer projecting between the stator surface and the rotor surface so as to define a minimum airgap between the stator and the rotor, wherein
   the spacer is disposed on or at one of the rotor surface and the stator surface, and has a curved contact surface configured to engage with the other one of the rotor surface and the stator surface.

2. The motor according to claim 1, wherein
   the rotor is configured to at least partially rotate about a rotation axis, with respect to the stator; and
   the spacer is aligned with the rotation axis.

3. The motor according to claim 1, wherein the spacer is at least partially formed from one or more of:
   a wear resistant material;
   a material with a low coefficient of friction; and
   an impact resistant material.

4. The motor according to claim 1, wherein the spacer is formed on or at, or connected to the stator such that the spacer projects from at least part of the stator surface.

5. The motor according to claim 1, wherein the stator surface is configured to receive a plate comprising the spacer.

6. The motor according to claim 1, comprising:
   a ball bearing configured to at least partially rotate with respect to the rotor and the stator, wherein
   the spacer is the ball bearing.

7. The motor according to claim 1, wherein
   the stator comprises a core formed of a plurality of laminations;
   the spacer is a projection extending from at least one of the ends of the laminations of the core.

8. The motor according to claim 1, wherein at least part of the rotor surface has a low friction coating.

9. The motor according to claim 1, wherein at least part of the stator surface has a low friction coating.

10. The motor according to claim 1, wherein the rotor comprises a magnet having a magnet surface, the magnet surface providing the rotor surface.

11. A stator for a motor in a personal care device, the motor comprising the stator and a rotor, the stator comprising:
    a stator surface; and
    a spacer projecting from the stator surface for engaging with a rotor surface of the rotor and defining a minimum airgap between the stator and the rotor, wherein
    the spacer comprises a curved contact surface configured to engage with the rotor surface.

12. A personal care device comprising the motor of claim 1.

13. A method of manufacturing a motor for a personal care device, the method comprising:
    mounting a rotor comprising a rotor surface in the motor;
    placing a stator comprising a stator surface in the motor adjacent to the rotor such that the rotor surface is opposite the stator surface and a spacer, disposed on or at one of the rotor surface and the stator surface, is projecting between the stator surface and the rotor surface so as to define a minimum airgap between the stator and the rotor;
    moving the stator towards the rotor such that a curved contact surface of the spacer engages with the other one of the rotor surface and the stator surface; and
    fixing the stator in the motor.

* * * * *